US007349406B1

(12) United States Patent
Robins et al.

(10) Patent No.: US 7,349,406 B1
(45) Date of Patent: Mar. 25, 2008

(54) METHOD AND APPARATUS FOR VIRTUAL NETWORK CONNECTION MERGING (75) Inventors: Michael Robins, Subiaco (AU); Mike Reynolds, Subiaco (AU)

(73) Assignee: Network Equipment Technologies Inc., Fremont, CA (US)

( * ) Notice: Subject to any disclaimer, the term of this patent is extended or adjusted under 35 U.S.C. 154(b) by 623 days.

(21) Appl. No.: 10/045,287

(22) Filed: Oct. 18, 2001

(51) Int. Cl.
H04L 12/28 (2006.01)
H04L 12/56 (2006.01)

(52) U.S. Cl. .............. 370/395.41; 370/235; 370/235.1; 370/395.31; 370/395.4; 370/395.42; 370/395.43; 370/465; 370/470; 370/471; 370/472; 370/474; 709/232; 709/233; 709/238

(58) Field of Classification Search ................ 709/233, 709/235, 236, 249, 229, 232, 234; 370/394, 370/395, 395.1, 395.41, 235, 235.1, 395.31, 370/395.4, 395.42, 395.43, 465, 470, 471, 370/472, 474
See application file for complete search history.

(56) References Cited

U.S. PATENT DOCUMENTS

| | | | | |
|---|---|---|---|---|
| 5,253,248 A * | 10/1993 | Dravida et al. ............. 370/228 |
| 5,561,663 A * | 10/1996 | Klausmeier ................. 370/468 |
| 5,627,819 A * | 5/1997 | Dev et al. ..................... 370/250 |
| 5,633,861 A * | 5/1997 | Hanson et al. .............. 370/232 |
| 5,651,005 A * | 7/1997 | Kwok et al. ................ 370/399 |
| 5,704,047 A * | 12/1997 | Schneeberger .............. 709/235 |
| 5,706,288 A * | 1/1998 | Radhakrishnan et al. ... 370/418 |
| 6,002,692 A * | 12/1999 | Wills ........................... 370/465 |
| 6,014,367 A * | 1/2000 | Joffe ............................ 370/230 |
| 6,047,326 A * | 4/2000 | Kilkki ......................... 709/228 |
| 6,049,526 A * | 4/2000 | Radhakrishnan et al. ... 370/229 |
| 6,144,666 A * | 11/2000 | Chen et al. ............... 370/395.3 |
| 6,185,209 B1 * | 2/2001 | Wicklund .............. 370/395.71 |
| 6,188,698 B1 * | 2/2001 | Galand et al. ............... 370/412 |
| 6,195,355 B1 * | 2/2001 | Demizu ....................... 370/397 |
| 6,229,812 B1 * | 5/2001 | Parruck et al. .............. 370/412 |
| 6,243,381 B1 * | 6/2001 | Cai et al. ..................... 370/392 |
| 6,285,657 B1 * | 9/2001 | Lewis et al. ................. 370/230 |
| 6,295,295 B1 * | 9/2001 | Wicklund .................... 370/392 |
| 6,359,861 B1 * | 3/2002 | Sui et al. ..................... 370/230 |
| 6,385,168 B1 * | 5/2002 | Davis et al. ................. 370/230 |
| 6,396,834 B1 * | 5/2002 | Bonomi et al. ............. 370/394 |
| 6,512,744 B1 * | 1/2003 | Hughes et al. .............. 370/232 |
| 6,549,517 B1 * | 4/2003 | Aweya et al. ............ 370/236.1 |
| 6,643,288 B1 * | 11/2003 | Santhanakrishnan ..... 370/395.1 |
| 6,654,374 B1 * | 11/2003 | Fawaz et al. ................ 370/394 |
| 6,721,797 B1 * | 4/2004 | Kim ............................ 709/232 |
| 6,728,257 B1 * | 4/2004 | Bharghavan et al. ....... 370/458 |
| 6,768,744 B1 * | 7/2004 | Kumaran et al. ........... 370/412 |
| 6,980,511 B1 * | 12/2005 | Li et al. ...................... 370/230 |
| 7,023,857 B1 * | 4/2006 | Chiussi et al. ........... 370/395.4 |
| 7,058,027 B1 * | 6/2006 | Alessi et al. .............. 370/310.1 |

* cited by examiner

Primary Examiner—Michael Won
(74) Attorney, Agent, or Firm—Townsend and Townsend and Crew (57) ABSTRACT A method and apparatus are provided for performing a virtual network connection merge. In one example, the method assembles at least one data unit from data traffic of at least one network connection. A credit is calculated for each network connection. A chosen data unit to be transmitted to an output channel is determined based on the credits of the network connections. The chosen data unit is then transmitted to the output channel.

27 Claims, 6 Drawing Sheets

METHOD AND APPARATUS FOR VIRTUAL NETWORK CONNECTION MERGING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to quality of service on computer networks, such as the Internet. The present invention more particularly relates to merging of traffic from multiple input connections into a single output connection, and to management of bandwidth of the merged traffic.

2. Discussion of Background

It is hard to dismiss the entrepreneurial nature of the Internet; this is no longer a research project. For most organizations connected to the global Internet, the Internet is a full-fledged business interest. Having said that, it is equally hard to dismiss the poor service quality that is frequently experienced. The rapid growth of the Internet, and increasing levels of traffic, make it difficult for Internet users to enjoy consistent and predictable end-to-end levels of service quality.

The Internet has historically offered a single level of service, that of "best effort," where all data packets are treated with equity in the network. However, we are finding that the Internet itself does not offer a single level of service quality, and some areas of the network exhibit high levels of congestion and consequently poor quality, while other areas display consistent levels of high quality service. Customers are now voicing a requirement to define a consistent service quality they wish to be provided, and network service providers are seeking ways in which to implement such a requirement. This effort is happening within the umbrella called "Quality of Service" (QoS). Examples of factors that effect QoS on the Internet include delay, bandwidth, and reliability.

Delay is the elapsed time for a packet to be passed from the sender, through the network, to the receiver. The higher the delay, the greater the stress that is placed on the transport protocol to operate efficiently. For Transfer Control Protocol (TCP), higher levels of delay imply greater amounts of data held "in transit" in the network, which in turn places stress on the counters and timers associated with the protocol. It should also be noted that TCP is a "self-clocking" protocol, where the sender's transmission rate is dynamically adjusted to the flow of signal information coming back from the receiver, via the reverse direction acknowledgments (ACK's), which notify the sender of successful reception. The greater the delay between sender and receiver, the more insensitive the feedback loop becomes, and therefore the protocol becomes more insensitive to short term dynamic changes in network load. For interactive voice and video applications, the introduction of delay causes the system to appear unresponsive.

Bandwidth is the maximal data transfer rate that can be sustained between two end points. It should be noted that this is limited not only by the physical infrastructure of the traffic path within the transit networks, which provides an upper bound to available bandwidth, but is also limited by the number of other flows which share common components of this selected end-to-end path.

Reliability is commonly considered a property of the transmission system, and in this context, it can be thought of as the average error rate of the medium. Reliability can also be a byproduct of the switching system. A poorly configured or poorly performing switching system can alter the order of packets in transit, delivering packets to the receiver in a different order than that of the original transmission by the sender, or even dropping packets through transient routing loops.

The Internet is composed of a collection of routers and transmission links. Routers receive an incoming packet, determine the next hop interface, and place the packet on the output queue for the selected interface. Transmission links have characteristics of delay, bandwidth and reliability. Poor service quality is typically encountered when the level of traffic selecting a particular hop exceeds the transmission bandwidth of the hop for an extended period time. In such cases, the router's output queues associated with the saturated transmission hop begin to fill, causing additional transit delay, until the point is reached where the queue is filled, and the router is then forced to discard packets or at least portions of packets (reduced reliability). This in turn forces adaptive flows to reduce their sending rate to minimize congestion loss, reducing the available bandwidth for the application.

Unfortunately, present methods of handling data packets have been inadequate, given the increasingly demanding transmission needs of users of the Internet.

SUMMARY OF THE INVENTION

It has been recognized that what is needed is a technique of managing data packets of network connections that provides more efficient use of bandwidth available to a set of network connections. Broadly speaking, the present invention fills this need by providing a method and apparatus for performing a virtual network connection merge. It should be appreciated that the present invention can be implemented in numerous ways, including as a process, an apparatus, a system, a device or a method. Several inventive embodiments of the present invention are described below.

In one embodiment, a method is provided for performing a virtual network connection merge. The method comprises the following steps: assembling at least one data unit from data traffic of at least one network connection; calculating a credit for each network connection; determining a chosen data unit to be transmitted to an output channel, wherein the step of determining the chosen data unit depends on credit of the network connections; and transmitting the chosen data unit to the output channel.

In another embodiment, an integrated circuit configured to perform a virtual network connection merge is provided. The integrated circuit comprises controller circuitry configured to control the following operations: assembling at least one data unit from data traffic of at least one network connection; calculating a credit for each network connection; determining a chosen data unit to be transmitted to an output channel, wherein the step of determining the chosen data unit depends on credit of the network connections; and transmitting the chosen data unit to the output channel.

Advantageously, the present invention demonstrates that high quality of service (QoS) is possible in the Internet, even with increasingly demanding transmission requirements.

Accordingly, it has been recognized that different customers have different QoS needs. For example, Internet users requiring large bandwidth connections need a higher QoS than Internet users requiring smaller bandwidth connections. The present invention exploits these variances in needs amongst customers. The present invention makes it possible to deliver differentiated levels of best effort traffic in a manner which is predictable, fairly consistent, and which provides the ability to offer discriminated service levels to different customers and to different applications.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a method and apparatus for performing a virtual connection merge. Numerous specific details are set forth in order to provide a thorough understanding of the present invention. It will be understood, however, to one skilled in the art, that the present invention may be practiced without some or all of these specific details.

The list below provides a quick reference to acronyms used in this disclosure.

Figure 1:
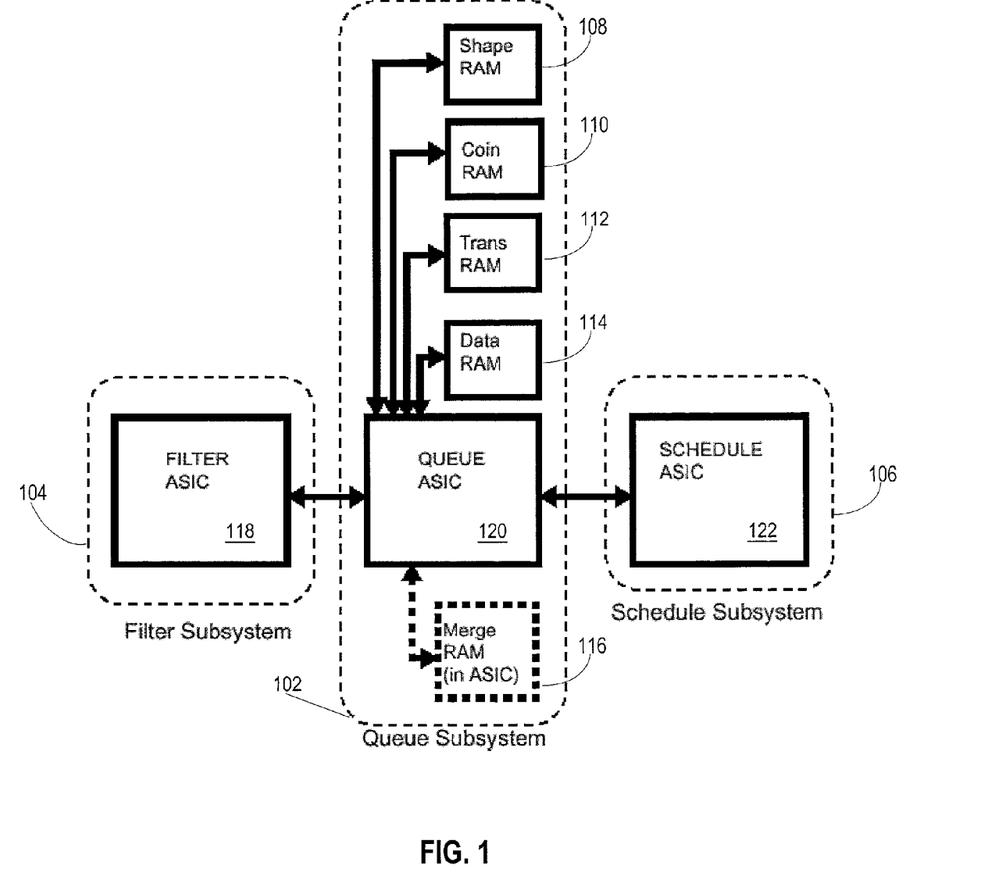
FIG. 1 shows the environment in which the Queue ASIC operates, in accordance with one embodiment of the present invention.

AAL—ATM Adaptation Layer
AAL5—ATM Adaptation Layer Type 5—single bit field in CD which indicates that cells on a connection constitute CPAAL5 PDU packets.
ASIC—application specific integrated circuit
ATM—Asynchronous Transfer Mode—a network technology based on transferring data in cells or packets of a fixed size.
BW—bandwidth, specifically within a merged connection
CAC—command and control software
CD—cell descriptor
CID—connection identifier
CLP—cell loss priority bit
CPAAL5_PDU—ATM Adaptation Layer 5 Protocol Data Unit
EFCI—explicit forward congestion indication
EOF—end of frame
FSS—Filter subsystem
FQI—Filter subsystem to Queue subsystem interface
GFR—guaranteed-Frame Rate
ID—identifier
MCC—multi-cast copy flag
Merging connection—an incoming connection that is being combined with several other connections into one output connection
Merged connection—generally refers to the merged output connection comprising of many input connections
Merge—refers to the internal data structures and all connections involved in a merging operation
MTS—main timing sequence
PDU—protocol data unit
QID—queue or class of service identifier
QSI—Queue subsystem to Schedule subsystem interface
QSS—Queue subsystem
SID—shape identifier
SIF—switch interface
SSS—Schedule subsystem (GSS and CSS in combination)
VC—virtual circuit
VC Merging—virtual circuit merging
VCM—virtual circuit merging
VP—virtual path
VPI/VCI—virtual path indicator/virtual circuit indicator
VSfRM—virtual source forward resource management General Overview of Environment FIG. 1 shows the environment in which the Queue ASIC 120 operates, in accordance with one embodiment of the present invention. The Queue ASIC 120 includes controller circuitry configured to control operations of the virtual connection merging process.

The Queue subsystem (QSS) 102 manages linked lists holding CDs awaiting output from the SIF2. In each MTS, the QSS 102 can receive up to 16 CDs from the Filter subsystem (FSS) 104 and outputs up to 4 CDs to the FSS 104. It outputs a shape token to the Schedule subsystem (SSS) 106 for every received CD and outputs a CD for every shape token when it receives them back from the SSS 106. To carry out these receives them back from the SSS 106. To carry out these operations, the Queue Asic 120 is in communication with a Shape RAM 108, a Coin RAM 110, a Trans RAM 112, a Data RAM 114, and a Merge RAM 116, which is in the Queue ASIC 120.

Figure 2:
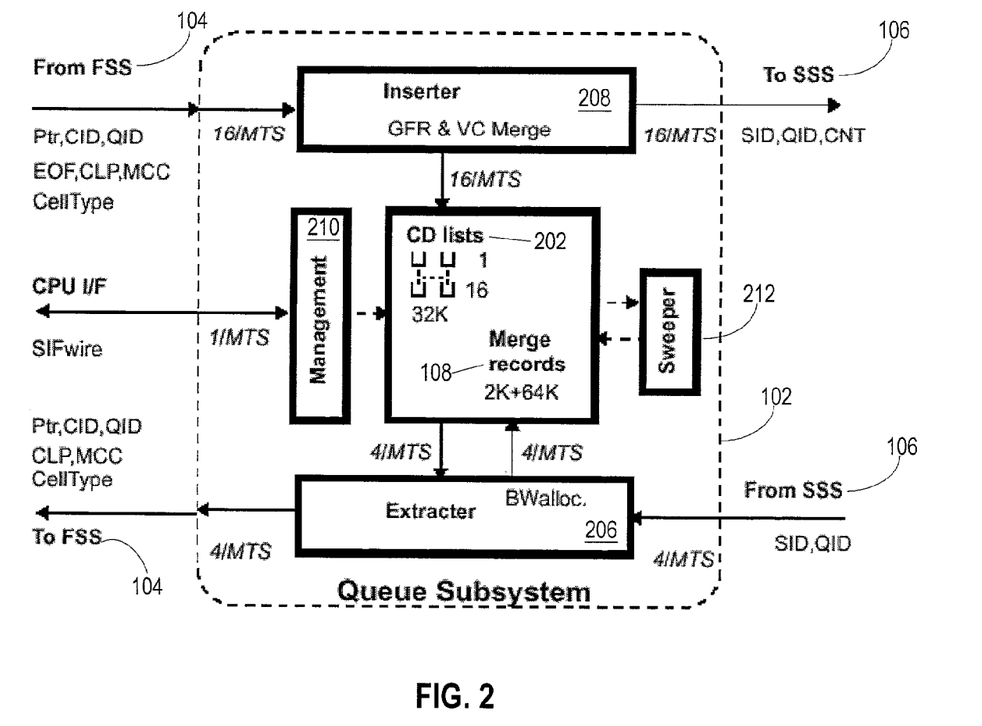
FIG. 2 shows the Queue subsystem (QSS), including the data flow and the main functional blocks, in accordance with one embodiment of the present invention.

FIG. 2 shows the QSS 102, including the data flow and the main functional blocks, in accordance with one embodiment of the present invention.

The CD List provides an array of 32K*16 linked lists—supporting 32K ShapeIDs with 16 QueueIDs. The linked lists 202 hold CellPointer, ConnectionID, QueueID, EOF, CLP, CellType and MulticastCopy fields, with CellPointer being the link to the next entry. ConnectionID and CLP are required since they either originate in or are modified by the Cell Control Path, and must be passed back to the Cell Data Path. CellType and MulticastCopy are required to simplify remapping of CellPointers in the Filter subsystem. EOF is only used by the QSS on VC merging connections to detect packet boundaries. The per-QID buffer occupancy count is incremented on receipt of a cell and decremented when the cell is sent back to the FSS requiring that the QID be stored for each cell.

Enqueuing of CDs into the CD Lists 202 occurs at up to 16 CDs/MTS. For each CD enqueued a token containing ShapeID, QueueID is sent to the Schedule subsystem 106. Dequeuing occurs at up to 4 CDs/MTS, with the linked list uniquely identified by the token containing ShapeID and QueueID from the Schedule subsystem. Counters hold the length of each of the 512K linked lists, purely for monitoring purposes.

The interface between Queue and Schedule subsystems carries ShapeID, QueueID and a token replication count. Importantly, individual CDs are NOT passed to the Schedule subsystem. Instead the token exchanged represents any CD of a given ShapeID/QueueID.

The Queue subsystem 102 performs many ConnectionID to one ShapeID) mapping using weighted bandwidth allocation to support GFR and VC merging. 2K merge connections merging up to 64K connections are supported. Any merge comprises cells at only one QueueID. Each output ShapeID determines a total merge bandwidth. Merging connections are allocated a proportion of this bandwidth by the CPU's assignment of relative frequency values. Full utilization of the bandwidth is achieved since only those connections that are ready, participate in the bandwidth allocation process. VC merging is performed on AAL5 traffic and interleaves complete frames.

The Queue subsystem maintains a sweeper which monitors the time since last access to each list of CDs. If a list is not accessed within a programmable period, it will be assumed that the CDs are no longer relevant and they will be returned to the Filter subsystem, where their CellPointers are to be put back on the free-list.

Data Structures and Flow

The Queue subsystem 102 has the following modes of operation:

normal CD buffering;
VC merging frame interleave and bandwidth scheduling;
GFR bandwidth scheduling;
Sweeper garbage collection; and
management CPU access.

The Queue ASIC 120 controls five RAM arrays—the Shape RAM 108, Coin RAM 110, Trans RAM 112, Data RAM 114 and Merge RAM 116. The ASIC uses these RAM arrays to store configuration and state information, linked list management information and linked list data.

Figure 3:
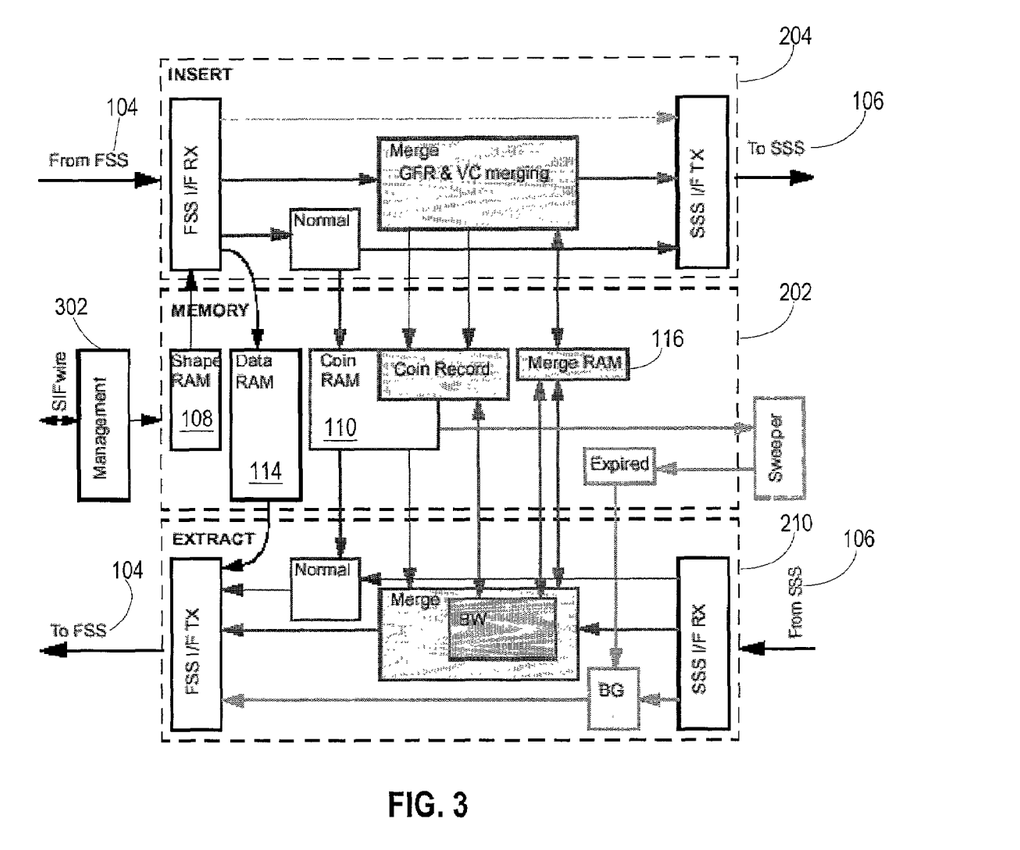
FIG. 3 shows in more detail the functional blocks and data structures within the QSS, in accordance with one embodiment of the present invention.

FIG. 3 shows in more detail the functional blocks and data structures within the QSS, in accordance with one embodiment of the present invention. Shade coding illustrates the data paths associated with its main operations.

The Shape RAM 108 holds per-ConnectionID: ShapeID and CLPoption definitions. Management access 302—both read and write—is provided to the Shape RAM 108.

An upper bank of the Shape RAM 108 also holds the per-merge Scan list head and tails.

The Coin RAM 110 holds heads and tails, activity flag and cell count for 512K linked lists—16 per-QueueID for each of 32K per-ShapeID lists. Management access 302—read only—is provided to the counts held in Coin RAM 110.

The upper bank of the Coin RAM 110 also holds per-connection information relating to VC merging and GFR. This information includes Packet-size, Full, Debit and Ready flags, ReadyCells count, Purse, Relative frequency value and count. Management access 302—read and write—is provided to the relative frequency values.

The Trans RAM 112, not shown in FIG. 3, holds per-connection links for the VC merging and GFR transmit and scan lists.

The Merge RAM 116 holds per-merge ShapeID: heads and tails of the Transmit and Spent lists associated with the merge. NB due to their less frequent access, the Scan list head and tail are held in the Shape RAM to save pins.

The Data RAM 114 holds CD fields which need to be ultimately returned to the Filter subsystem 104 when the associated cell is to be transmitted. This includes ConnectionID, QueueID, EOF, MCC, CellType and CLP. The CellPointer stored with this data is a link to the next CD in the list, while the address itself is the Cell pointer of this CD. No management access is provided to this RAM.

RAM Usages

Table 3-1 below outlines the data structures that perform the functions described above. While all the data structures are shown in the five SHAPE, COIN, TRANS, MERGE and DATA RAMs. To make efficient use of interface pins and RAM chips the physical arrangement of the fields is slightly more complicated.

| RAM | Address | Contents | Data Type | Usage Mode |
| --- | --- | --- | --- | --- |
| SHAPE | CID | SID CLPoption | Shape Table | Normal VCM GFR |
| COIN | SID/QID | Head Tail Activity ReadyCells | CD List | Normal |
| COIN | CID | Head Tail Activity ReadyCells Psize Purse Ready Full Debit Freq RelFreq | Merge CD List & Status | VCM GFR |
| TRANS | CID | Transmit Scan | Links | VCM GFR |
| MERGE | MID (a subrange of high SIDs) | Transmit Scan Spent H & T | Merge Record | VCM GFR |
| Register | Expired | Head Tail | Expired CD List | Sweeper |
| DATA | CellPtr | CID QID CLP EOF MCC CellType Next | Cell Descriptor & Link | Normal VCM GFR |

Normal Queue Operation

The operation of the QSS 102 for normal connections is provided here. A cell descriptor (CD) is presented to the QSS 102 by the FSS 104 on the FQI DATA bus. The CD contains several fields including CID, QID, CellPointer and a few bits that have to be stored and returned to the FSS 104 with the Cell Pointer when the time comes.

The QSS 102 uses the CID to look up shape information that has previously been configured by the CPU in the Shape RAM 108. The shape information comprises a Shape ID (SID) and a CLPoption bit.

If the CLPoption bit is set, then the CLP bit in the CD is reset before the CD is stored on the CD list. The CLP bit can be cleared in this way because the output connection will now be shaped to be conforming to its contract.

The Cell Pointer and ancillary information from the CD are then stored in the Data RAM by using the Cell Pointer to index the Data RAM and adding this address to the tail of the CD list. That is, the data fields are stored at Data RAM location Cell Pointer→DATA and the Cell Pointer is stored at the location Tail pointer→NEXT, the Tail pointer is then set to Cell Pointer. The count of CDs on the list is also incremented at this time. CD lists are indexed by SID and QID.

A shape token is then passed to the SSS 106, across the QSI DATA bus to indicate that a cell is awaiting transmission. The shape token comprises SID, QID and, in normal operation, a replication count of zero. The SSS 106 schedules the token through to a port list for transmission at the appropriate time. In VC merging operation the replication count indicates the number of extra tokens that the SSS 106 should infer, i.e. the replication count will be packet_size−1.

Each MTS, the SSS 106 returns up to four shape tokens back to the QSS 102 representing cells that it has scheduled for transmission. This token comprises a SID and QID. The QSS 102 must determine which CD will be sent.

Using the SID and QID returned by the SSS 106 the QSS 102 indexes a CD list via the Coin RAM and removes a CD from the head of the CD list. This CD is then presented to the FSS 104 for output from the system.

Merging connections are treated slightly differently, as is explained below. The basic differences are that only the CID is used to index the Coin RAM and extra information is held in order to allocate the bandwidth, of the combined shape, between the connections that are participating in the merge. On return of a Shape token for a merge from the SSS 106, lists of CD lists are used to determine which CD list contains the next CD to be transmitted to the FSS 104.

If any of the subsystems do not have a CD or token to transmit at any time they indicate this with all zeros in the CID/CellPtr or SID fields. These situations provide RAM bandwidth opportunities for either management access or sweeper expired connection access. An empty output token from the SSS 106 may be utilized by the QSS 102 to return a CD from an expired CD list to the FreeList held by the FSS 104. This situation is indicated by a CellType NODATA with valid Cell Pointer.

The integrity of the interface buses is confirmed each MTS by the QSS 102 writing test patterns which are read by the FSS 104 and SSS 106, complemented and written back across the respective bus to the QSS 102.

Guaranteed Frame Rate

Guaranteed Frame Rate (GFR) is a class of service in which a connection is guaranteed a minimum amount of bandwidth but is generally offered more. The way GFR is implemented is that within the switch, a certain amount of bandwidth is allocated to GFR connections. This bandwidth is at least the sum of all the guaranteed minimum amounts. As cells arrive on GFR connections they consume their minimum bandwidth and, if there is unused bandwidth from other GFR connections, this extra bandwidth is allocated to them.

While GFR is a frame based service, it is described in terms of cells so as to be applicable to ATM systems. Basically, a minimum cell rate is determined from the frame rate for some particular size of packet. In fact, no consideration is given to the frame structure. The QSS 102 simply guarantees the minimum cell rate and makes more bandwidth available when possible.

Bandwidth is allocated to GFR connections in proportion to their contracted minimum rate. Any excess or unused GFR bandwidth is allocated proportionally between the connections that have extra traffic.

Cells from GFR traffic are interleaved by the bandwidth allocation process but retain their own CID, so that the cells can still be identified.

Each merge occurs within a single shape and since a shape token is destined for a particular port, GFR is performed on a per-port basis. Per-VP merging can also be accommodated. This is performing GFR merging into an output connection where the bandwidth is defined and shared on the basis of a particular group of connections not the GFR class of service in general.

GFR cells all generate the same per-merge ShapeID transmitted to the SSS 106 which shaped the traffic to the overall bandwidth allocated to GFR traffic through the port. When the tokens return to the QSS 102 the bandwidth is spread amongst the GFR connections in proportion to their contracted minimum. Exactly how the bandwidth is spread is further discussed below in the discussion with reference to FIG. 5 and FIG. 6.

Virtual Circuit Merging

Virtual Circuit merging (VC merging) interleaves many incoming connections to a single outgoing connection on a packet by packet basis. Packets are buffered by the QSS 102 which uses the EOF flag to identify packet boundaries. The order in which packets are output is determined from the relative time of arrival of the EOFs and a weighted allocation of the output connection's bandwidth (determined by the shape).

Specified incoming connections are each buffered until complete packets have been received. The packets are then transmitted one at a time on a single out-going connection. This "many to one" multiplexing can be performed for most QueueIDs but any one merge may contain only one QueueID.

Bandwidth within the VC merge is allocated between incoming connections in proportion to their programmable relative frequency values. Unused bandwidth within a merge is available to other ready connections within the same merge. The bandwidth allocation mechanism is further discussed below in the discussion with reference to FIG. 5 and FIG. 6.

Replicated Shape Tokens

Independent of the bandwidth allocation mechanism, consideration must be given to the accounting of tokens sent to the SSS 106. In general each cell that is received generates a token.

However, with VC merging a shape token can not be generated until the full packet has been assembled. Most cells will not immediately generate a token to the SSS 106.

For each VC merging connection, a count is kept of cells received that constitute an incomplete packet. The arrival of end of frame cell generates a token and terminates the packet under construction. The packet size less one (excluding the EOF cell) is passed to the SSS 106, as the replication count of the shape token. This is the only situation where a nonzero replication count is passed to the SSS 106 as part of the shape token.

The maximum packet size is determined from the maximum CPAAL5_PDU of ((65535+48+8)MOD 48)=1366 which will require an 11 bit counter [ref ATM and AAL Protocols Generic Requirements, July 1993, Section 8.5].

When one less than the maximum packet size has been reached all subsequent CDs up to the next EOF are appended to the Expired list. The activity flag of the CD list will not be updated. The EOF terminates the packet which is now sent in the normal way.

Sweeper

As a background task the Queue ASIC 120 maintains an activity flag associated with each list of Cell Descriptors (CD list). These flags are set whenever any access is made to the CD list. The background sweeper task steps through each entry in the Coin RAM 110, examining and resetting the activity flags. The task then waits before stepping through again. If the activity flag has not been set again since the last sweep (i.e., access to the list exceeds some maximum idle time), all of the cell descriptors in the list are transferred to the Expired list.

The various operations that read the CD lists have to be aware that the lists could be emptied by the sweeper and be able to handle any inconsistencies that this may cause. For example, the merge lists must treat an empty list as if the connection had finished transmission of all of its data. Such situations should not occur and may waste output bandwidth and will be flagged to the CPU, for example, by setting the LIST-WARN bit and WARN SRC field of the control register.

The timer period is selected by setting two programmable down counters. Examples of the programmable registers are SWEEP-PRESCALE and SWEEP-PERIOD. Prescale is decremented each MTS and reloaded with the programmed value on zero. Period is decremented each time prescale reaches zero and is reloaded with the programmed value. A sweep is initiated every time the period counter reaches zero. During the sweep, a flag is set and the down counter is disabled to ensure that there is a minimum time between successive sweeps. Setting the SWEEP PERIOD register to zero turns off the sweeper function.

The sweeper keeps its data in registered variables. The Expired list has per-QID head and tail pointers to lists of CDs in the Data RAM.

A count of the number of CDs appended to the Expired list by the sweeper is available to the CPU in the SWEEP-COUNT register. The SID/QID of the last cleared list is stored in the SWEEP LAST register. The sweeper FLAG, which indicates that a sweep is in progress, is also presented in the SWEEP-LAST register. For test purposes only the sweeper SID/QID and FLAG can be set through writes to this register.

Management Interface

A two wire synchronous serial interface is provided to the Queue ASIC 120 for the purposes of management control by the CPU. This interface follows the SIFwire protocol.

Management Statistics

The QSS 102 keeps count of the number of cells in the various CD lists which are available to the management CPU via the SIFwire interface.

CLPoption Bit Reset

Each connection ID has an associated bit which is obtained from the Shape RAM 108 called the CLPoption bit. This bit allows the QSS 102 to reset the CLP bit of CDs received from the FSS 104. The purpose of this function is to remove the CLP tagging associated with the cell since the connection is being shaped in this switch. Since it is being buffered and shaped it will once again be conforming to its contract.

When the CLPoption bit is set, the CLP bit in the CD will be reset for all cells on the given shape. If the CLPoption flag is not set, the CLP bit is returned to the FSS 104 unaltered. The CLPoption bit is configured by the CPU.

Connection Merging and Bandwidth Allocation

The operations of GFR and VC merging both require that a given bandwidth is shared between a number of connections and that the share of the bandwidth allocated to a particular connection is in proportion to its contract. For GFR, the connections are interleaved in the output stream retaining their own CID. Each VC merged output stream has one output CID, but the data from the input connections has been buffered and is output as interleaved packets.

Bandwidth for a merge is generated as a particular shape. Shape tokens are sent to the SSS 106 for each cell that arrives on the merging connections and are returned by the SSS 106 at the rate of the combined bandwidth. When these shape tokens are received back by the QSS 102, the QSS 102 performs a look-up to determine which CD list the next cell will be sent from. A system of lists and counts is maintained to point to the list that has been allocated the next output slot associated with this shape's token. The slots are distributed between the ready connections (connections that have cells ready to send) in proportion to their relative frequency values.

The basic mechanisms for GFR and VC merging are similar except for slight differences to keep track of packets. The general mechanism is described here with the specifics elaborated below.

Setting Up a Merge

To establish a merge, the CPU sets up a shape, in the SSS 106, for the combined bandwidth. The ShapeID that is allocated defines the associated merge record in the QSS 102 Merge RAM. No explicit setup is required in the QSS 102.

Individual connections are added to the merge by (a) setting each connection's shape entry in the QSS Shape RAM to point to the merge's shape and (b) assigning them a relative frequency value in the Coin RAM 110.

The eventual mapping of incoming CID to an output VPI/VCI is performed by another ASIC (e.g., the Forte ASIC). VC merging connections must be set up (in egress processor) to all map to the one output VPI/VCI. GFR merged connections will all maintain their unique identifiers.

The SID that is allocated for the shape is used to identify the token returned from the SSS 106 as being associated with a merge. There are three ranges of SIDs—normal unmerged, VC merging and GFR. The ranges are defined by the boundary values written to the ASIC's registers at initialization.

Registers in the QSS ASIC set the lower boundary for the subranges of SID and CID. Programmable boundaries maximize the use of SID and CID values depending on the application. All IDs above these boundaries will be treated as merging connections. The merge boundaries are MERGE_SID_MIN, GFR_SID_MIN, and MERGE_CID_MIN. MERGE_SID_MIN is the Minimum SID that is available for VC merging or GFR traffic. GFR_SID_MIN is Minimum SID that is available for GFR traffic. This value must be greater than the MERGE-SID-MIN. It is also an upper boundary on VC merging SID values. MERGE_CID_MIN—Minimum CID that can be used for merged connections. This value determines how many of the SID/QID entries in the CoinRAM will be addressed by CID for merging connections. It also determines the maximum SID that is available for normal non-merged connections—which will be less than the MERGE-SID-MIN value. MERGE_CID_MIN is not an ASIC register but a value that the software will have to use when allocating CIDs to merging and non-merging connections.

These boundaries should be set at initialization and not altered. The maximum size of these ranges is determined by address constraints in the QSS ASIC design. Merge SIDS are limited by the depth of the internal Merge RAM to 2K merges. The range of mergeable CID's can be up to the full 64K Merging Connections into One Output Shape Each merge has a list (the Transmit List) of incoming connections, which have cells that are ready to be sent. These cells are GFR cells or complete packets in the case of VC merging connections. As these connections become ready to transmit, shape tokens for all of the cells are transferred to the SSS 106 to be scheduled for output. When these shape tokens are returned to the QSS 102 it must look-up the associated merge record in the Merge RAM 116 and determine from which connection (i.e. CD list) to send a cell.

Figure 4:
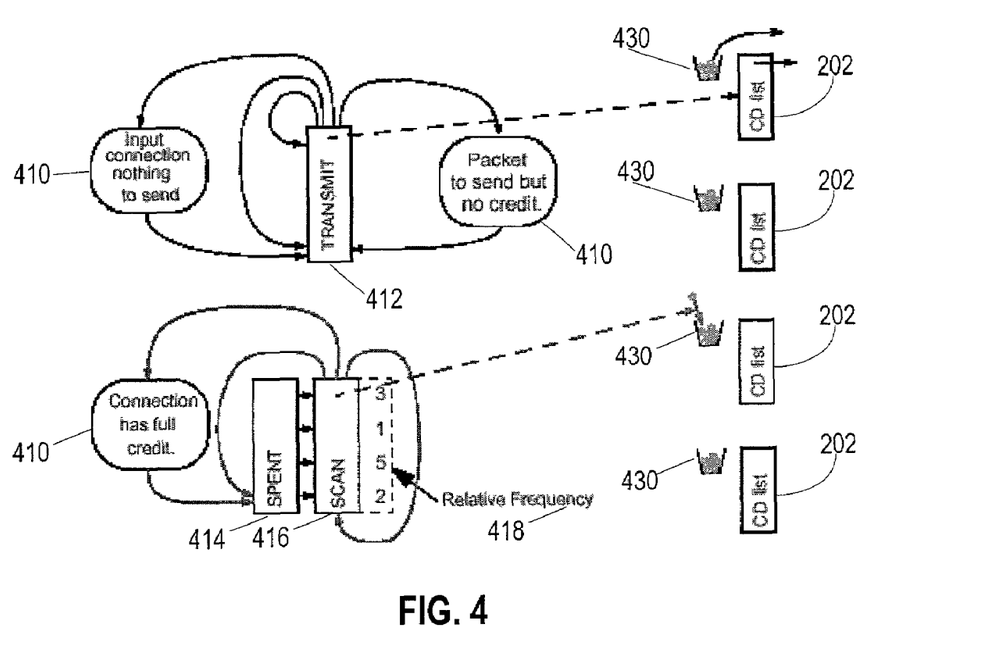
FIG. 4 illustrates the data structures used in a virtual network connection merge, in accordance with one embodiment of the present invention.

FIG. 4 illustrates the data structures used in a merge, in accordance with one embodiment of the present invention. The rectangular boxes represent CD lists 202. The clouds 410 hold connections in a particular state but not on the CD lists 202. Arrows represent data flow and dashed arrows show a reference. The purse is represented by a bucket of coins 430. However, it should be remembered that the credit could be negative after a large packet is sent.

A mechanism is required to examine this list of ready to transmit connections in order to allocate the available bandwidth amongst them. The real-time nature of the QSS 102 means that no searching or skipping over an empty connection can be tolerated in the algorithm, so a second list (the Scan List 416) is maintained. The Scan List 416 contains connections that are participating in the bandwidth allocation process for the merge.

In one example, the bandwidth allocation mechanism uses two lists to keep track of connections that are participating in a merge's bandwidth allocation. Connections are moved from the Scan List 416 to this Spent List 414 once they have been allocated all of their bandwidth for this round in the bandwidth allocation process. Eventually, all connections will be moved to the Spent list 414 and the Scan list 416 will be empty, whereupon the pointers of the Scan list 416 and Spent list 414 are swapped over. The connection's relative frequency counts are also reloaded for another round of bandwidth allocation to commence.

Figure 5:
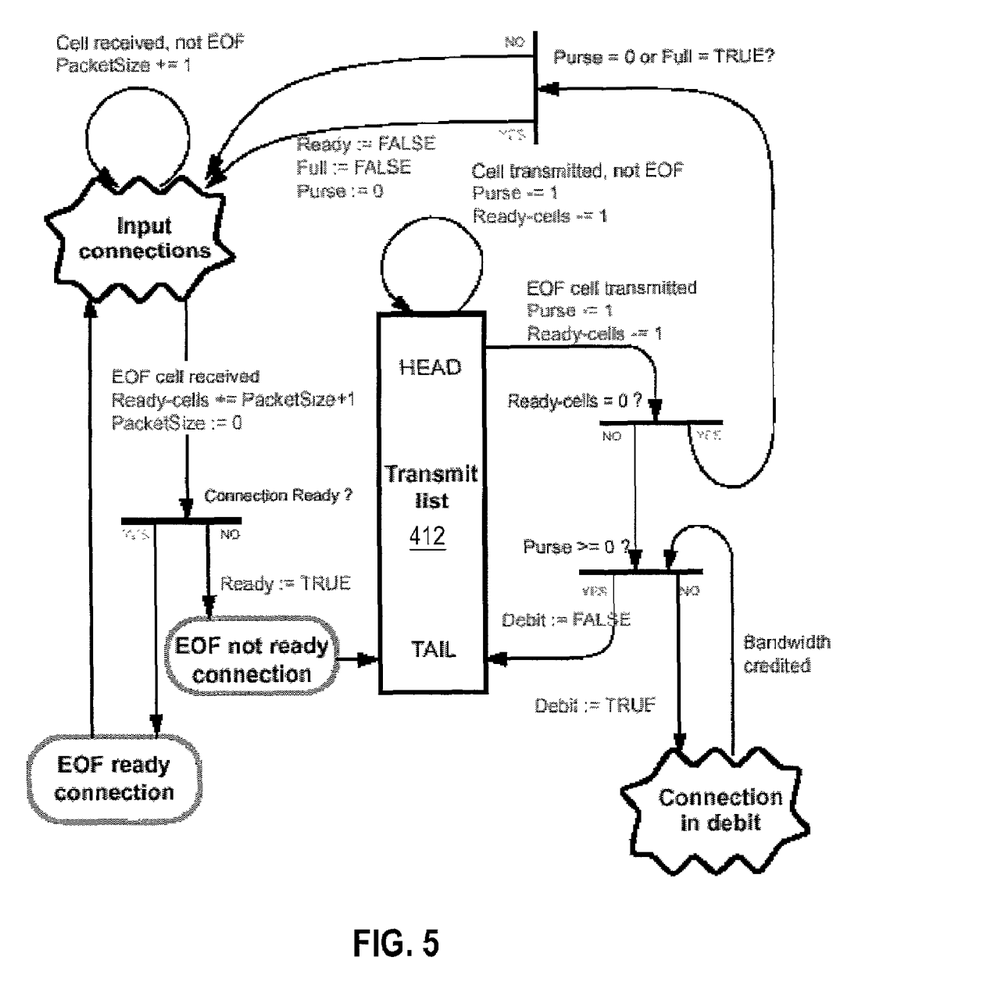
FIG. 5 illustrates the operations involving the transmit list with diagrams showing the data structures, state transitions and state variables, in accordance with one embodiment of the present invention.
Figure 6:
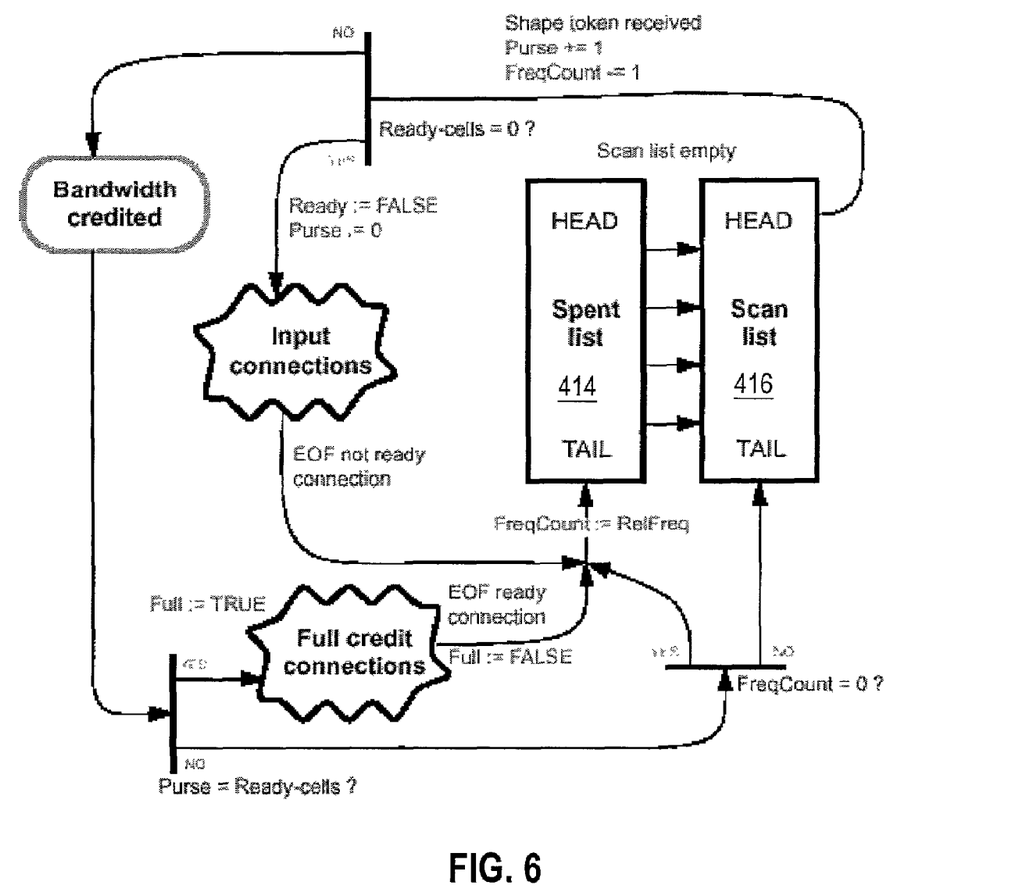
FIG. 6 illustrates the operation of the bandwidth allocation lists with diagrams showing the data structures, state transitions and state variables, in accordance with one embodiment of the present invention.

FIG. 5 and FIG. 6 illustrate the operation of the connection merging lists with diagrams that show the data structures, state transitions and state variables, in accordance with one embodiment of the present invention. FIG. 5 illustrates the operations involving the transmit list 412. FIG. 6 illustrates the operation of the bandwidth allocation lists 414 and 416. Interaction between the two data structures is indicated by events that are generated in one and the state transitions that they trigger in the other.

As cells arrive in the QSS 102, they are added to their associated CD list 202. All CIDs in the merge generate the same SID which is sent to the SSS 106. The arrival of a cell on a connection may make the connection eligible to be included in the output stream. That is, the CD list 202 may now contain cells that are ready to be sent. If this is the case, the CD list 202 is appended to the transmit list of the merge.

When merge SIDs are received back from the SSS 106, a cell is sent from the connection at the head of the transmit list 412 for the merge. A system of counts is used to control the proportion of the bandwidth taken by each connection.

Each connection that is ready to send (ready), receives credits for bandwidth in proportion to its programmable relative frequency 418. This bandwidth credit is spent as the cells are transmitted. The connection becomes ineligible to remain on the transmit list 412 if its purse is negative.

The transmit list 412 contains connections that have cells to transmit and a positive purse. The connections in debit are not explicitly held in a list, but a reference to each ready connection is always held somewhere in the transmit list 412, scan list 416 or spent list 414. When a connection relinquishes the opportunity to transmit, the opportunity is passed from the head to the subsequent connection in the transmit list 412. Since credits equal debits, the total balance across the ready connections will be zero, ensuring that one connection will always be eligible for the transmit opportunity.

Once a connection has no more cells to send, it is removed from the transmit list 412 as well as the scan list 416 and the spent list 414. Removal from the scan list 416 and the spent list 414 is deferred slightly to avoid the need for doubly linked lists.

At the end of transmitting a packet, a connection's purse may be negative. This negative state is OK because what remains is that other higher bandwidth connections in the merge have been allocated the credits associated with each cell in the excessive packet. If other traffic is not present then the excessive packet would have been allocated the whole bandwidth, and its purse would be zero. A connection going not-ready with a negative purse means that the scan list 416 will be empty at some later time.

Once a connection has had a transmission opportunity, the connection may be moved from the head to the tail of the transmit list 412 in order to spread out the transmitted cells as much as possible.

Delayed Removal from Scan Lists

When a connection has transmitted all of its cells it is removed from the transmit list 412. At this point, the connection will still be on the scan list 416 and the spent list 414 if the purse was in debit. The connection is left in the scan list 416 and the spent list 414 for the time being and it is still considered to be ready in the merge.

When it reaches the head of the scan list 416, the connection will be given a credit and then dropped from the lists 414 and 416 because the connection's ready-cells count is zero. The lost credit is not a problem because lost credit will be going to a connection that is in debit which implies that other connections have already been given extra credits.

Once the connection is removed from the scan list 416 and the spent list 414, the connection is not-ready, and the connection's Purse is reset to zero.

A connection that receives an EOF and has cells ready to be sent again before it is removed from the scan list 416, will have ready-cells greater than zero. So the connection will not be dropped and will continue in the bandwidth and transmission lists 412.

A Closer Look at the Accounting

Each connection in a merge has a relative frequency value assigned by the CAC. While the connection is ready, credits are allocated to the connection in proportion to the relative frequencies of all other ready connections in the same merge.

It is essential that the number of credits and debits are equal and all are accounted for. For each shape token received from the SSS 106, one cell must be transmitted to the FSS 104. The transmission costs one credit. A single credit is created for every shape token that is received.

Two lists are used to allocate the bandwidth credits. Initially, all ready connections are on the scan list 416 and have a frequency count equal to their relative frequency 418. As a credit is generated, the credit is added to the purse of the connection at the head of the scan list 416 whose frequency count is then decremented. When the frequency count is zero the connection is moved to the spent list 414, and the connection's frequency count is reloaded with the connection's relative frequency value 418. If the frequency count is not zero the connection is moved from the head to the tail of the scan list 416.

When the scan list 416 becomes empty, the connection is swapped with the spent list 414.

Problems arise as connections become and cease to be ready. Consider the case where a VCM connection has just sent a large packet and gone into debit. The connection becomes not-ready at the end of the packet but shortly afterwards receives the EOF of another packet. The connection goes back on the ready lists but should not become eligible to transmit until it is out of debit. Note that while the connection rebuilds its credit, it must not consume physical bandwidth.

The other side to this case is a connection that was in debit but has not transmitted for a long time. This connection should not start at a disadvantage.

A solution to this problem is for a connection not to relinquish the transmit opportunity until all of its credits have been spent. Relinquishing after each packet (cell in GFR) is done to avoid bursting and to give as even a throughput as possible.

Another problem is connections that have been held up. These connections could have a positive credit but nothing to send. These connections then leave the transmit lists 412 with a negative net balance and no ready connections eligible to transmit.

A solution to this problem is to be more selective in allocating credits. Each connection keeps a count of how many cells the connection has as ready-cells, and each connection is only allocated credits until the purse is equal to the number of cells of ready-cells. At this point, the connection is removed from both the scan list 416 and spent list 414 (NB in this state, the connection will still be on the transmit list). When more cells (a complete packet for VCM) arrive, the ready-cells count is increased and the connection is added to the spent list 414, and possibly also the transmit list 412.

A count of the number of cells received on each connection that constitute an incomplete packet under construction is kept. This packet-size is added to the ready-cells count on EOF when the connection becomes ready.

Summary of VC Merging

The mechanism described above effectively implements VC merging. Cells are assembled from incoming connections into the CD lists until an EOF cell is received. The ready connection and its packet are then included into the merge bandwidth allocation and transmit lists, which transmit cells from the CD list until an EOF cell is transmitted. For VC merging, the transmit list is not relinquished until all packets have been sent as long as the connection has enough credit to transmit.

Guaranteed Frame Rate (GFR)

GFR bandwidth is allocated by the above mechanism on a cell by cell basis. A connection becomes ready whenever it has cells on the CD list and the transmit opportunity is relinquished after each cell. Every cell is treated as an EOF cell.

With GFR there is no need for a packet-size count. Although a connection will never go into deficit, the scan list credit mechanism will still control when a connection goes onto the transmit list and how much bandwidth it can consume.

For GFR connections the head of the transmit list 412 is always relinquished after sending a cell. This is to interleave cells rather than bunch them.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, assembling at least one data unit from data traffic of at least one network connection, calculating a credit for each network connection, determining a chosen data unit to be transmitted to an output channel, and transmitting the chosen data unit to the output channel, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing a virtual network connection merge, the method comprising:
    assigning a relative frequency value to each network connection in a plurality of network connections, wherein a higher relative frequency value is assigned to a network connection requiring a higher relative bandwidth;
    allocating credits to ready network connections in the plurality of network connections in proportion to relative frequency values of ready network connections of a same virtual network connection merge, a ready network connection being a network connection ready to send a data unit, wherein the ready network connections comprise a first list and credits are allocated to the ready connections of the first list through one or more rounds of bandwidth allocation such that a ready network connection is removed from the first list in a round of bandwidth allocation when it has been allocated credits at least equal to its relative frequency value;

assembling one or more data units from data traffic of ready network connections in a second list comprising ready network connections that have been allocated credits through the one or more bandwidth allocation rounds;

determining a chosen data unit to be transmitted to an output channel from among the assembled data units, the chosen data unit belonging to a first connection in the ready network connections of the second list;

transmitting the chosen data unit to the output channel; and adjusting the credit of the first connection based upon the data unit transmitted, wherein after transmitting the chosen data unit the first connection is removed from the second list if it is no longer a ready network connection or if its credits are less than zero, otherwise the first connection is moved to the tail of the second list.

2. The method of claim 1, wherein the step of assembling at least one data unit comprises:

allocating the data traffic of the at least one data unit into memory cells;

adding the memory cells to cell descriptor (CD) lists until an end of frame (EOF) cell is received, wherein the end of frame cell is used to identify unit boundaries.

3. The method of claim 1, further comprising calculating a higher credit for network connections that have a data unit ready for transmission, wherein a ready data unit is a whole data unit with memory cells filled with data traffic.

4. The method of claim 2, wherein the step of transmitting the chosen data unit comprises:

allocating merge bandwidth for the chosen data unit;

adding memory cells of the chosen data unit to transmit lists; and transmitting the memory cells of the chosen data unit to the output channel based on information in the transmit lists, wherein the memory cells of the chosen data unit are transmitted until an end of frame cell of the chosen data unit is transmitted.

5. The method of claim 1, further comprising:

determining another chosen data unit to be transmitted to the output channel; and transmitting the other chosen data unit to the output channel.

6. The method of claim 5, further comprising performing steps of the method until all data units from ready network connections in the second list with sufficient credit have been transmitted.

7. The method of claim 1, wherein the ready network connections include Asynchronous Transfer Mode (ATM) connections.

8. The method of claim 1, further comprising:

assigning a bandwidth guarantee to each network connection;

receiving an overload of traffic from a network connection having a relatively low bandwidth guarantee; and storing the overload of traffic into at least one stored data unit.

9. The method of claim 1, wherein the determining step comprises:

generating a particular bandwidth shape token for the virtual network connection merge; and receiving a bandwidth shape token configured to assist in identifying the chosen data unit.

10. An integrated circuit configured to perform a virtual network connection merge, the integrated circuit comprising:

controller circuitry configured to control operations of:

assigning a relative frequency value to each network connection in a plurality of network connections, wherein a higher relative frequency value is assigned to a network connection requiring a higher relative bandwidth;

allocating credits to ready network connections in the plurality of network connections in proportion to relative frequency values of ready network connections of a same virtual network connection merge, a ready network connection being a network connection ready to send a data unit, wherein the ready network connections comprise a first list and credits are allocated to the ready connections of the first list through one or more rounds of bandwidth allocation such that a ready network connection is removed from the first list in a round of bandwidth allocation when it has been allocated credits at least equal to its relative frequency value;

assembling one or more data units from data traffic of ready network connections in a second list comprising ready network connections that have been assigned credits through the one or more bandwidth allocation rounds;

determining a chosen data unit to be transmitted to an output channel from among the assembled data units, the chosen data unit belonging to a first connection in the ready network connections of the second list;

transmitting the chosen data unit to the output channel; and adjusting the credit of the first connection based upon the data unit transmitted, wherein after transmitting the chosen data unit the first connection is removed from the second list if it is no longer a ready network connection or if its credits are less than zero, otherwise the first connection is moved to the tail of the second list.

11. The integrated circuit of claim 10, wherein the controller circuitry is further configured to control operations of:

allocating the data traffic of the at least one data unit into memory cells;

adding the memory cells to cell descriptor (CD) lists until an end of frame (EOF) cell is received, wherein the end of frame cell is used to identify unit boundaries.

12. The integrated circuit of claim 10, wherein the controller circuitry is further configured to control an operation calculating a higher credit for a network connection having a data unit that is ready for transmission, wherein a ready data unit is a whole data unit with memory cells filled with data traffic.

13. The integrated circuit of claim 11, wherein the controller circuitry is further configured to control operations of:

allocating merge bandwidth for the chosen data unit;

adding memory cells of the chosen data unit to transmit lists; and transmitting the memory cells of the chosen data unit to the output channel based on information in the transmit lists, wherein the memory cells of the chosen data unit are transmitted until an end of frame cell of the chosen data unit is transmitted.

14. The integrated circuit of claim 10, wherein the controller circuitry is further configured to control operations of:

determining another chosen data unit to be transmitted to the output channel; and transmitting the other chosen data unit to the output channel.

15. The integrated circuit of claim 14, wherein the controller circuitry is further configured to carry out operations of the integrated circuit until all data units from ready network connections in the second list with sufficient credit have been transmitted.

16. The integrated circuit of claim 10, wherein the ready network connections include at least one Asynchronous Transfer Mode (ATM) connection.

17. The integrated circuit of claim 10, wherein the controller circuitry is further configured to control operations of:

assigning a bandwidth guarantee to each network connection;

receiving an overload of traffic from a network connection having a relatively low bandwidth guarantee; and storing the overload of traffic into at least one stored data unit.

18. The integrated circuit of claim 10, wherein the controlling circuitry is further configured to control operations of:

generating a particular bandwidth shape token for the virtual network connection merge; and receiving a bandwidth shape token configured to assist in identifying the chosen data unit.

19. A computer-readable medium carrying one or more sequences of one or more instructions for performing a virtual network connection merge, the one or more sequences of one or more instructions including instructions which, when executed by one or more processors, cause the one or more processors to perform the steps of:

assigning a relative frequency value to each network connection in a plurality of network connections, wherein a higher relative frequency value is assigned to a network connection requiring a higher relative bandwidth;

allocating credits to ready network connections in the plurality of network connections in proportion to relative frequency values of ready network connections of a same virtual network connection merge, a ready network connection being a network connection ready to send a data unit, wherein the ready network connections comprise a first list and credits are allocated to the ready connections of the first list through one or more rounds of bandwidth allocation such that a ready network connection is removed from the first list in a round of bandwidth allocation when it has been allocated credits at least equal to its relative frequency value;

assembling one or more data units from data traffic of ready network connections in a second list comprising ready network connections that have been assigned credits through the one or more bandwidth allocation rounds;

determining a chosen data unit to be transmitted to an output channel from among the assembled data units, the chosen data unit belonging to a first connection in the ready network connections of the second list;

transmitting the chosen data unit to the output channel; and adjusting the credit of the first connection based upon the data unit transmitted, wherein after transmitting the chosen data unit the first connection is removed from the second list if it is no longer a ready network connection or if its credits are less than zero, otherwise the first connection is moved to the tail of the second list.

20. The computer-readable medium of claim 19, wherein the step of assembling at least one data unit further causes the processor to carry out the steps of:

allocating the data traffic of the at least one data unit into memory cells;

adding the memory cells to cell descriptor (CD) lists until an end of frame (EOF) cell is received, wherein the end of frame cell is used to identify unit boundaries.

21. The computer-readable medium of claim 19, wherein the instructions further cause the processor to carry out a step of calculating a higher credit for network connections that have a data unit ready for transmission, wherein a ready data unit is a whole data unit with memory cells filled with data traffic.

22. The computer-readable medium of claim 20, wherein the step of transmitting the chosen data unit further causes the processor to carry out the steps of:

allocating merge bandwidth for the chosen data unit;

adding memory cells of the chosen data unit to transmit lists; and transmitting the memory cells of the chosen data unit to the output channel based on information in the transmit lists, wherein the memory cells of the chosen data unit are transmitted until an end of frame cell of the chosen data unit is transmitted.

23. The computer-readable medium of claim 19, wherein the instructions further cause the processor to carry out the steps of:

determining another chosen data unit to be transmitted to the output channel; and transmitting the other chosen data unit to the output channel.

24. The computer-readable of claim 23, wherein the instructions further cause the processor to perform the steps until all data units from ready network connections in the second list with sufficient credit have been transmitted.

25. The computer-readable medium of claim 19, wherein the ready network connections include Asynchronous Transfer Mode (ATM) connections.

26. The computer-readable medium of claim 19, wherein the instructions further cause the processor to carry out the steps of:

assigning a bandwidth guarantee to each network connection;

receiving an overload of traffic from a network connection having a relatively low bandwidth guarantee; and storing the overload of traffic into at least one stored data unit.

27. The computer-readable of claim 19, wherein the determining step further causes the processor to carry out the steps of:

generating a particular bandwidth shape token for the virtual network connection merge; and receiving a bandwidth shape token configured to assist in identifying the chosen data unit.

* * * * *